Oct. 4, 1932.  E. W. DAVIS  1,880,854
LUBRICATING SYSTEM AND APPARATUS
Filed Sept. 16, 1927  2 Sheets-Sheet 2
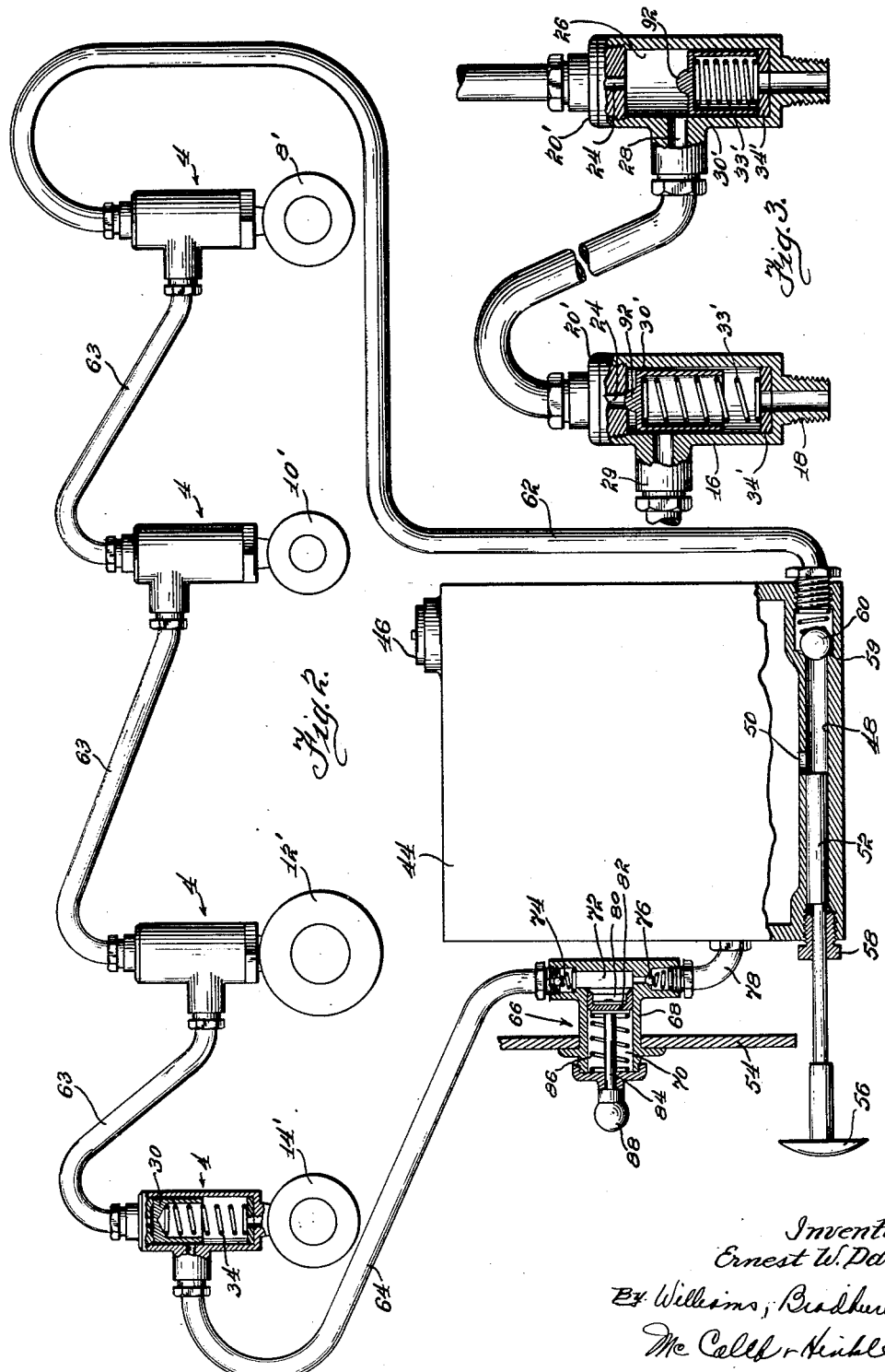
Inventor
Ernest W. Davis
By Williams, Bradbury,
McCalla & Hinkle
Attorneys Patented Oct. 4, 1932

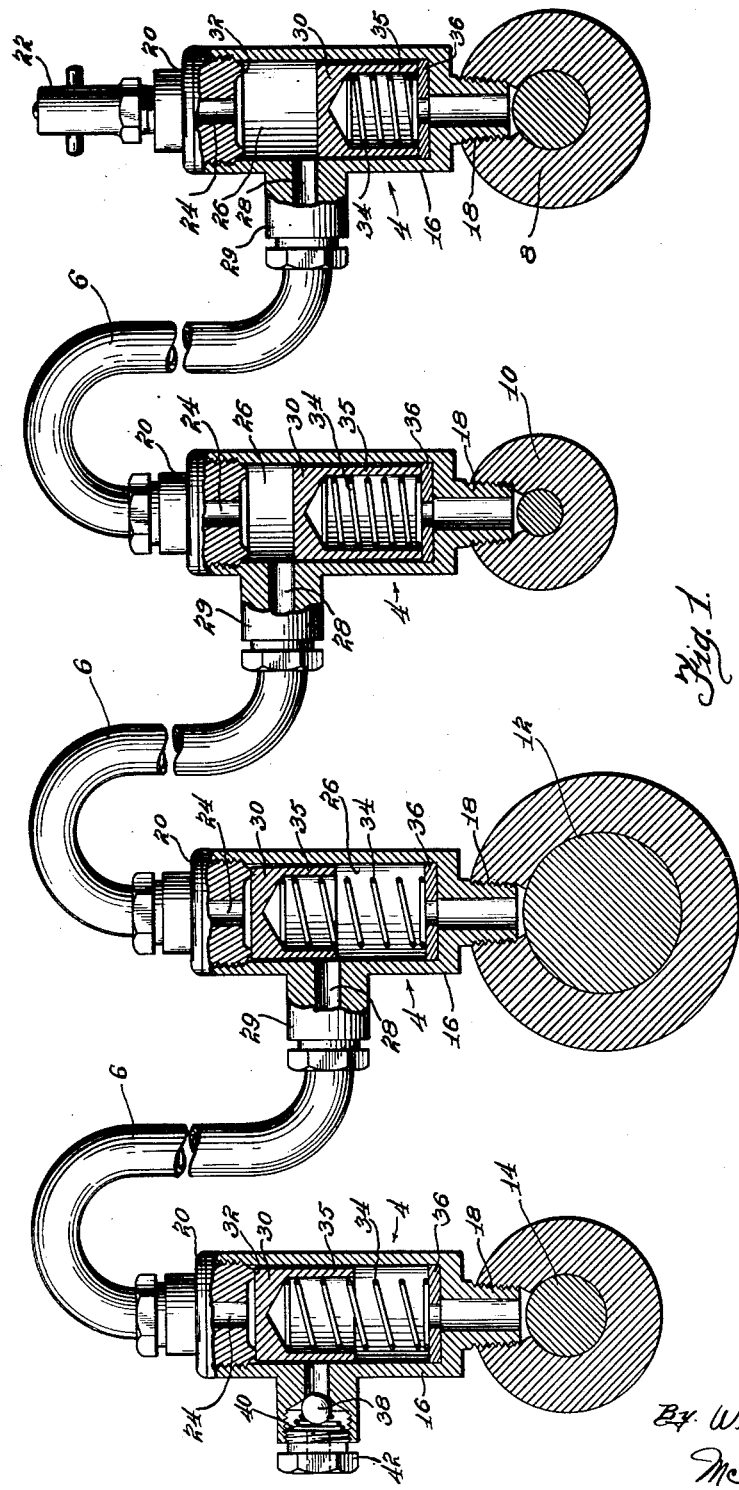

1,880,854

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM AND APPARATUS

Application filed September 16, 1927. Serial No. 219,837.

My invention relates generally to lubricating apparatus and systems in which a plurality of bearings are connected by a suitable conduit system so as to be supplied with lubricant from a single source, and more particularly to systems in which the bearings are connected in series and progressively supplied with measured charges of lubricant.

It is an object of by invention to provide a lubricating system which is positive in operation, simple in construction and which may be economically manufactured.

A further object is to provide an improved system of this type in which each of a series of bearings may be successively supplied with a measured charge of lubricant and in which means are provided to indicate the completion of the lubricating operation.

A further object is to provide a system of lubrication, and apparatus therefor, in which a charge measuring device adjacent each of the bearings to be lubricated is adapted to be operated upon a pressure which is less than that required for the operation of the next succeeding device of the series.

A further object is to provide a visual signal to indicate the completion of the lubricating operation.

A further object is to provide a system of lubrication and apparatus therefor in which a minimum of conduit tubing is required to connect the bearings with the source of lubricant.

A further object is to provide an improved lubricating system and apparatus in which a well-known type of hand operated compressor may be used as a source of lubricant.

A further object is to provide a system of lubrication in which the number of bearings to be lubricated may vary greatly and which will operate successfully in lubricating a large number of bearings.

A further object is to provide an improved system of lubrication in which the bearings may be divided into related groups, and each group lubricated as a unit.

Other objects will appear from the following description, reference being had to the accompanying drawings in which:

Figure 1 is a diagrammatic view of the lubricating system of my invention, in which the measuring devices are shown partially in central vertical cross section;

Figure 2 is a similar view showing a system employing a reservoir and pumping mechanism permanently mounted in connection with the conduits, and Figure 3 is an elevation of two measuring valves and connections, the valves being in central vertical section.

The lubricating system of my invention is particularly adapted for use in lubrication of the chassis bearings of automotive vehicles with grease or heavy oils, and as shown in Figure 1 comprises a plurality of measuring valves 4 connected in series by conduits 6 and threaded into bearings 8, 10, 12 and 14, which are illustrative of the chassis bearings of an automobile, or other machine, which require lubrication. As shown in Figure 1 each of the measuring devices comprises a body 16 having a threaded portion 18 adapted to be screwed into the bearing to be lubricated, and a cap 20 threaded into the upper end of the body. The cap 20 is internally threaded to permit attachment of a suitable lubricant receiving nipple 22 which is herein illustrated as a "pin fitting" of well-known construction. The cap 20 has a passage 24 leading from this fitting to the cylindrical chamber 26 of the valve body. The chamber 26 has a side outlet port 28 in a boss 29 to which the conduit 6 may be attached. A piston-shaped valve 30, which is of slightly less diameter than the diameter of the chamber 26, is normally held in uppermost position by a compression coil spring 34, as shown in the device attached to bearing 12, the upper plane surface of the valve seating against an annular seat 32 formed at the lower end of the cap 20. When in its lowermost position, (as at bearing 10) the end of the skirt portion 35 of the valve 30 engages a gasket 36 of any suitable packing material, thereby preventing escape of lubricant to the bearing. The last device of the series, here shown as connected to bearing 14, has a spring pressed ball check valve 38 normally closing its outlet port, the spring 40 thereof seating against a ported bushing 42.

In operation of the system, a lubricant compressor having a coupling of the type shown in the patent to Gullborg No. 1,307,734 dated June 24, 1919, is attached to the fitting 22 and lubricant forced therefrom into the measuring device attached to bearing 8, forcing the piston valve 30 downwardly against its spring 34 until the skirt portion 35 of the valve seats upon the gasket 36, closing the outlet to the bearing. The resistance of the conduit to the flow of lubricant between the devices attached to bearings 8 and 10 is sufficient to cause the valve 30 of the device attached to bearing 8 to seat on this gasket prior to passage of lubricant from the device of bearing 8 to that of bearing 10 and also to maintain the valve on its seat while the remaining devices of the series are being operated. When the valve 30 is seated on this gasket 36, lubricant will be forced through the conduit 6 to the next adjacent device attached to bearing 10 and force the valve 30 thereof downwardly in a similar manner. The devices attached to bearings 12 and 14 will be similarly operated in succession. After the last device of the series, represented as attached to the bearing 14, is operated, lubricant will be extruded from the outlet port of the bushing 42, thus giving a visual signal to the operator to indicate that all of the devices have been filled with lubricant. The compressor may then be detached from the fitting 22, whereupon the valves 30 will be forced upwardly by their springs 34, since the lubricant in the chambers 26 above the valves can by-pass between the valves and the cylinders to the spaces formed below the valves. It will be apparent that after one or two operations as above described, the devices will become completely filled with lubricant so that as the valves 30 travel downwardly on the application of pressure, they will force the lubricant before them into their respective bearings. The clearances between the valves 30 and their respective cylindrical chambers are shown slightly exaggerated in the drawings, so as more clearly to illustrate their operation. It is to be understood however, that upon application of pressure to the top of the valve, when the valve is not seated upon its gasket 36, the lubricant will not pass around the valve because the pressures on the opposite sides thereof will be substantially equal, and because the valve will be moving downwardly quite rapidly so that there will not be sufficient time for an appreciable quantity of lubricant to by-pass from the space above to the space below the valve. In addition, the skirt portions 35 of the piston valves are relatively long, thereby increasing the resistance to by-pass flow of the lubricant.

The upward stroke of the valves will be relatively slow, and, since the springs 34 are of approximately the same strength, the pressures maintained in each of the chambers 26 on the upstroke will be substantially the same. At the most, there will not be a sufficient pressure differential between any two adjacently connected devices to overcome the frictional resistance to flow through the conduit 6 connecting the devices.

I have illustrated the bearings as being of various sizes to represent the quantity of lubricant which should be supplied to them. It will be noted that the skirt portions 35 of the valves 30 are of different lengths, that in the device attached to the bearing 12, which requires the greatest amount of lubricant being the shortest, while that of the device attached to the bearing 10, requiring the least amount of lubrication, is the longest. Bearings 8 and 14 are assumed to require the same amount of lubrication. By increasing the length of the skirt portion of the valve, its stroke is correspondingly decreased, thereby diminishing its displacement. This forms a convenient method of adapting each device to deliver the proper quantity of lubricant to its bearing. Of course, other methods, such as shortening the cylinder or increasing its diameter may be employed.

In Figure 2 I have shown a central system including a pump permanently connected, in which the principles of the device as illustrated in Figure 1 are utilized. This system is particularly adapted for use in the lubrication of an automobile or similar machine. The measuring devices 4, attached to bearings 8', 10', 12' and 14' may be identical to those previously described and are merely illustrative of practically any number of these devices, as may be required for any particular machine. In this system the reservoir for the lubricant comprises a tank or container 44 which has a suitable filling opening closed by a cap 46. This container is preferably attached to the dash-board of the automobile or to some other part of the vehicle, where it will be accessible for filling and for convenient operation of the pump attached thereto. The lower end of the container has a transverse cylinder 48 which communicates with the bottom of the inside of the container through an inlet port 50. A plunger 52 is freely slidable within this cylinder and extends outwardly beyond the instrument board 54 of the vehicle, terminating in a suitable handle 56. A packing gland 58 is threaded in the end of the cylinder 48 to prevent a leakage of the lubricant past the plunger 52. The outlet port 59 at the opposite end of the cylinder 48 is normally closed by a spring pressed ball check valve 60 forming the outlet valve of the pump. A conduit 62 connects the outlet with the first measuring device 4 of the series. As in Fig. 1, the measuring devices are connected in series, as by pipe conduits 63. The outlet of the last measuring valve of the series is connected by a conduit 64 to an indicating device designated generally as 66, which is mounted on the instrument board 54 and comprises a T-shaped body 68 having a cylinder 70 formed at right angles to a passage 72 extending through the end of the body. The conduit 64 is connected at one end of this passage 72, the end of the conduit normally being closed by a spring pressed ball check valve 74. A similar check valve 76 normally closes the other end of said passage, which latter is connected by a pipe elbow 78 to the container 44. A piston 80 comprising a cup leather 82 secured between a pair of plates attached to a stem 84 is freely slidable within the cylinder 70, being normally maintained in its right hand position as shown in Figure 2 by a spring 86. The outer end of the stem 84 has a spherical knob 88 secured thereto to limit the inward movement of the stem, to provide means by which said stem and piston may be manually operated, as will be hereinafter described and to serve as an indicator. The knob may be painted, enameled or otherwise finished in a bright color so as to be readily visible to the operator.

The operation of the system illustrated in Fig. 2 will now be described.

When it is desired to lubricate the bearings of the automobile or the machine to which the system is attached, the plunger 52 is manually reciprocated by means of the button or handle 56, forcing the lubricant past the check valve 60 through the conduit 62 into the measuring device 4 attached to the bearing 8'. This device and the remaining measuring devices 4 are operated progressively in the same manner as previously described with reference to the system illustrated in Fig. 1. After the valve 30 of the measuring device 4 which is attached to the last bearing of the series, here numbered 14', has completely operated, it will uncover the outlet port of this device and lubricant will be forced through the conduit 64 past the check valve 74 into the chamber 72, and force the piston 82 and stem 84 outwardly against the resiliency of the spring 86, thus indicating to the operator that all of the measuring devices have been operated. If the operator fails immediately to notice this signal, no harm will be done, for lubricant will be forced from the chamber 72 past the check valve 76 into the reservoir 44, since the spring of the check valve 76, while sufficient to withstand a pressure great enough to compress the spring 86, will permit the valve 76 to open after the spring 86 has been fully compressed. As soon as the operator notices that the indicator 66 has been actuated he will cease operating the plunger 52, and will return the indicator to its normal position by pressure on the knob 88, thereby forcing the lubricant contained in the cylinder 70 past the check valve 76 back to the reservoir.

From the above described method of operation it will be noted that I have provided a system in which the failure of one of the measuring valves to operate may be readily detected, since in such instances the valve which fails to operate will maintain its outlet port closed so that the flow through the conduit circuit will be interrupted and the indicator will not be actuated. However, due to the fact that the full effective pressure which may be developed by the pump plunger 52 is successively exerted upon each of the measuring devices, the valves thereof may be easily forced to operate by increasing the pressure applied even if they should happen to stick to the upper valve seat or otherwise be prevented from operation by gummed oil or foreign matter in the lubricant.

In Fig. 3 I have illustrated two measuring devices which represent an improved modification of the general type previously described. These valves are similar to those illustrated in Figs. 1 and 2, except that their caps 20' are not provided with an annular seat 32, but the edge of the inlet port 24 forms a valve seat which is adapted to be closed by a hemispherical projection 92 formed on the top surface of the piston valve 30'. In this way the pressure required initially to move the valve 30' when the valve is in its uppermost position, is much greater than that required to initially move the valves 30 in the devices shown in Figs. 1 and 2, since the area of the piston valve which is exposed to the lubricant pressure is much less. Since this initial pressure required to start movement of the piston valve from its seat at the inlet port is very much greater than that required to compress the spring 33', after the downward movement of the valve 30' has been started, movement will continue throughout the full stroke of the valve until it seats upon its gasket 34'. The complete stroke of the first measuring valve of the series will thus be assured before the beginning of the movement of the valve of the device next in series, since the operation of the latter will require a much greater pressure than that necessary to hold the piston valve 30', of the first device of the series firmly against its gasket 34'. Thus each piston valve will be maintained firmly upon its gasket, thereby sealing the outlet port to the bearing, while the following valves of the series are being successively operated.

The measuring device shown in Fig. 3 may, of course, be substituted for those shown in the combinations illustrated in Figs. 1 and 2, without any essential changes in the systems or in the methods of operation.

While I have shown and described my invention as applied to only a relatively few bearings, I wish it to be understood that I contemplate connecting any number of measuring devices in series, so that if desired all of the bearings of a vehicle or other machine may be supplied with lubricant from the single source. If desired, the bearings which are stationary relative to one another during the ordinary operation of the vehicle, may be grouped together and supplied with lubricant from one source and other bearings having a different relative movement may be grouped together and connected in series and supplied with lubricant from a different source, thereby eliminating the necessity for flexible or articulated conduits. The embodiment of my invention illustrated in Fig. 1 is particularly adapted for the latter method of grouping the bearings, while that illustrated in Fig. 2 is better adapted for a lubricating system in which all of the bearings of an automotive vehicle or other machine are lubricated from a single source. Means automatically or semi-automatically actuated by a moving part of the vehicle may be utilized to reciprocate the plunger 52, if desired.

While I have shown and described a preferred embodiment of my invention, I do not wish to be limited to the structures shown, but desire the scope of my invention to be limited only by the claims which follow.

I claim:

1. In a system of the combination described, the combination of a plurality of bearings to be lubricated, a lubricant measuring device secured adjacent each of said bearings and having a passage communicating therewith, conduits connecting said devices in series, and means connected to the last device of the series for visually indicating that it has been operated, said means comprising a cylinder having inlet and outlet ports, check valves normally closing said ports, a spring pressed plunger in said cylinder, and a visual indicator connected to said plunger.

2. A measuring device for use in a central lubricating system comprising a chamber having an inlet port of small diameter and two outlet ports, and a piston valve reciprocable in said chamber and having a hemispherical projection normally closing said inlet port, said valve being adapted to force lubricant from said chamber to one of said outlet ports upon supplying lubricant under pressure through said inlet port, and subsequently to open the other outlet port.

3. A lubricant charge measuring device for use in a central lubricating system, comprising a cylindrical chamber, means for connecting said chamber with a bearing to be lubricated, a piston valve reciprocable in said chamber, a cap secured at the upper end of said chamber, resilient means for forcing said valve against said cap, an inlet port in said cap normally closed by said valve, an outlet port for said chamber open only when said valve is in its lowermost position, means to seal the connection to the bearing when the valve is in its lowermost position, and means permitting a slow by-pass of lubricant around said valve when it is forced upwardly by said resilient means.

4. A measuring device for use in a central lubricating system comprising a cylinder having a relatively small inlet port and two outlet ports, and a piston valve reciprocable in said chamber, said valve having a projection adapted to close said inlet port, said valve being adapted to force lubricant from said chamber to one of said outlet ports upon supplying lubricant under pressure through said inlet port, and subsequently to open the other outlet port.

5. A lubricant charge measuring device for use in a central lubricating system, comprising a cylindrical chamber, means for connecting said chamber with a bearing to be lubricated, a piston valve reciprocable in said chamber, a cap secured at the upper end of said chamber, a spring for forcing said valve against said cap, an outlet port in said chamber open only when said valve is in its lowermost position, and means to seal the connection to the bearing when the valve is in its lowermost position, said chamber being of a size sufficient to permit slow by-passage of lubricant around said valve when forced upwardly by said spring.

6. A lubricant measuring device having a casing with an inlet and two outlets, and a single element in said casing operated by the pressure of fluid entering said inlet, for delivering a predetermined charge through one outlet and then closing the same and at approximately the same time placing the other outlet in open communication with said inlet.

7. A pressure lubricating system comprising a plurality of machine elements to be lubricated, supply means for delivering lubricant under pressure, and valved control devices, one associated with each of said elements, each device normally cutting off all devices more remote from the supply and operating to deliver a measured quantity of lubricant to its associated element, to open communication to the next device, and shortly thereafter to seal the connection to its said associated element.

8. In a system of the class described the combination of a plurality of machine elements to be lubricated, lubricant measuring devices associated with said elements, a lubricant reservoir, a lubricant pump communicating therewith, conduits connecting said devices in series to said pump, means in each of said devices adapted to cut off flow of lubricant to the devices following in the series until charges of lubricant have been forced into their associated elements, means operable upon flow of lubricant from the last device of said series to actuate an indicator, and means permitting flow from said last device to said reservoir after operation of said indicator.

9. In a system of the class described the combination of a plurality of machine elements to be lubricated, lubricant measuring devices associated with said elements, a lubricant reservoir, a lubricant pump communicating therewith, conduits connecting said devices in series to said pump, means in each of said devices adapted to cut off flow of lubricant to the devices following in the series until charges of lubricant have been forced into their associated elements, an indicator having inlet and outlet ports, a conduit connecting the last device of said series with the inlet port of said indicator, a conduit connecting the outlet port of said indicator with said reservoir and check valves in said inlet and outlet ports to prevent flow in a direction from said reservoir to the last device of said series.

10. A fluid measuring device comprising a body having a cylindrical bore therein, an inlet port and two outlet ports in said body, and a single valve reciprocable in the bore of said body and adapted successively to uncover said inlet port, uncover the first of said outlet ports, and close the second outlet port upon a fluid pressure impulse applied at said inlet port, open the second outlet port, close the first outlet port and close the inlet port when said fluid pressure is relieved.

11. A fluid measuring device comprising a body having a cylindrical bore therein and provided with an inlet and two outlet ports, a single valve operable upon a fluid pressure impulse to move from normal position and force fluid from said bore through one of said outlet ports and subsequently to establish communication between said inlet port and the other outlet port, and resilient means to return said valve to normal position.

12. A fluid measuring device comprising a body having a bore therein, an inlet port and two outlet ports in said body, a single valve element movable in said bore to uncover first said inlet port, uncover one of said outlet ports, and close the other outlet port upon application of fluid pressure and open said last-named outlet port, close the first-named outlet port, and finally close the inlet port in this predetermined sequence upon the relieving of said fluid pressure.

13. In a system of the class described, the combination of a plurality of machine elements requiring lubrication, a charge measuring device associated with each of said elements, conduit means connecting said devices in series, a source of lubricant under pressure connected to the first device of the series, each of said devices having an outlet port connected to the inlet port of the device next in series, and a one-way check valve associated with the outlet port of the last device of the series to permit extrusion of lubricant to the atmosphere whereby the completion of the operation of the system may be indicated.

In witness whereof, I hereunto subscribe my name this 9th day of July, 1927.

ERNEST W. DAVIS.